for 20 minutes and allowed to cool down to 25° C. gradually in half an hour. While stirring, 3-amino-5-methylisoxazole (9.81 parts by weight) is added to the reaction mixture, which is preserved at 25 to 30° C. Four hours after the addition of the isoxazole compound, anhydrous trisodium phosphate (5.41 parts by weight) is added to the mixture, which is stirred for 4 hours. The reaction mixture is allowed to stand at room temperature for 16 hours, cooled below 10° C. with a cryogen of ice-sodium chloride bath, mixed with cold water (150 parts by weight) and 10% aqueous sodium sulfite solution (21.13 parts by weight) is added thereto until the brown color of iodine disappears to precipitate light yellow crystals. The reaction mixture is made slightly alkaline with 28% aqueous ammonia solution (49.87 parts by weight) (or 10% aqueous sodium hydroxide solution) and shaken with chloroform (100 parts by volume) twice. The chloroform layers are combined and washed with water (50 parts by volume). The aqueous washings are still shaken with chloroform (50 parts by volume). All the chloroform layers are combined, dried over anhydrous sodium sulfate and evaporated under reduced pressure to remove the chloroform. There is obtained crude 3-amino-4-iodo-5-methylisoxazole (21.00 parts by weight) as light yellow crystals. The yield is 94.20%. When the crystals were chromatographed on a thin layer plate (Kiesel gel F, 300μ; developing solvent, benzene/ether= 1/1; detected with UV irradiation and the Ehrlich coloring reagents), the most part of the spots were the objective 4-iodo compound and very slight spots of the starting material and side product were observed. The crude product showed a 98.16% of purity.

The crude product is recrystallized from 20% methanolic solution to give 3-amino-4-iodo-5-methylisoxazole as colorless crystals melting at 98 to 100° C.

*Note.*—Assay of the purity: A solution of the sample (about 400 μg.) in a suitable solvent was spotted on the origin of the thin layer silicagel plate and developed with a suitable developing solvent. The silicagel mixture collected by excoriating the spot of the iodinated compound appearing on the plate was burned according to the oxygen flask method, that is, a kind of the elementary analysis and the iodine content was determined (Sugita et al.: Japan Analysis, vol. 16, 133 (1967)).

EXAMPLE 2

Into a four-necked flask equipped with a stirrer, a thermometer, a drying tube of calcium chloride and a gas introducing tube, there are put iodine (13.96 parts by weight) and dry methanol (31 parts by volume) (water content: 0.029%), and gaseous chloride (3.79 parts by weight) is introduced into the reaction system with stirring. The resultant mixture is cooled at 25 to 30° C. with ice-water bath, stirred at the same temperature for half an hour, warmed at 50° C. for 20 minutes and allowed to cool down to the ordinary temperature in 40 minutes. While stirring, 3-amino-5-methylisoxazole (9.81 parts by weight) is added to the reaction mixture, which is kept at 20 to 25° C. Four hours after addition of the isoxazole compound, anhydrous trisodium phosphate (5.41 parts by weight) is added to the mixture, which is stirred for 4 hours. The reaction mixture is allowed to stand at room temperature for 16 hours, cooled below 10° C. with a cryogen bath of ice-sodium chloride and 10% aqueous sodium sulfite solution (25.89 parts by weight) is added thereto to dissolve the dark brown color of the residual iodine. The reaction mixture is made slightly alkaline with 28% aqueous ammonia (2.97 parts by weight) and evaporated on a water bath under reduced pressure to remove the methanol. The residue is cooled at room temperature, mixed with water (100 parts by volume) and purified similarly to Example 1 by chloroform extraction to give 3-amino-4-iodo-5-methylisoxazole (19.98 parts by weight) as light yellow crystals showing a 97.72% of purity. The yield is 89.20%.

EXAMPLE 3

To the reaction mixture obtained similarly to Example 2 by mixing iodine (9.52 parts by weight), dry methanol (15.0 parts by weight) and gaseous chlorine (2.66 parts by weight), there is added 3-acetylamino-5-methylisoxazole (7.00 parts by weight). While stirring, the resultant mixture is warmed at 50° C. for 8 hours. Four hours, 6 hours, and 7 hours after addition of the isoxazole compound, there are added 2.45 parts by weight, 1.23 parts by weight and 1.22 parts by weight of sodium methyl carbonate (obtained from a solution of sodium methoxide in methanol and carbon dioxide). The reaction mixture is allowed to stand overnight, and 10% aqueous sodium sulfite solution (29.92 parts by weight) is added to the mixture to dissolve the dark brown color of iodine. The resultant mixture is made slightly alkaline with 28% aqueous ammonia (3.27 parts by weight), mixed with cold water (50 parts by volume) and shaken with chloroform (50 parts by volume) twice. The chloroform layers are combined and washed with water (25 parts by volume). The aqueous washings are shaken with chloroform (25 parts by volume). All the chloroform layers are combined, dried over anhydrous sodium sulfate and the solvent is evaporated to give crude 3-amino-4-iodo-5-methylisoxazole (10.61 parts by weight) (yield: 94.7%, purity: 96.33%). The thin layer chromatogram of this substance showed a small spot of the starting 3-acetylamino-5-methylisoxazole and very slight spots of the side-produced 3-amino-5-methylisoxazole and 3-acetylamino-4-iodo-5-methylisoxazole together with the spot of the objective product. This substance is recrystallized from 20% methanol to give pure crystals melting at 98 to 100° C.

EXAMPLE 4

To the reaction mixture obtained similarly to Example 1 by mixing iodine (15.86 parts by weight), glacial acetic acid (20.0 parts by weight) (water content: 0.043%) and gaseous chlorine (4.36 parts by weight), there is added 3-(p-acetylaminobenzenesulfonamido) - 5-methylisoxazole (14.77 parts by weight). While stirring, the resultant mixture is warmed at 50° C. One hour after addition of the said isoxazole compound anhydrous sodium acetate (4.10 parts by weight) is added thereto and the reaction is finished in 24.0 hours. The reaction mixture is cooled below 10° C., and 10% aqueous sodium sulfite solution (114 parts by weight) is added to the mixture to dissolve the dark brown color of the iodine. Cold water (100 parts by volume) is added to the light yellow reaction mixture, which is made at pH about 3.0 with 10% aqueous sodium hydroxide solution. The precipitated crystals are collected by filtration and washed with water (25 parts by volume) four times to give 3-(p-acetylaminobenzenesulfonamido)-4-iodo-5-methylisoxazole.

The acetylated compound is hydrolyzed in a conventional manner with 10% aqueous sodium hydroxide solution while heating to give crude 3-sulfonylamido-4-iodo-5-methylisoxazole (18.21 parts by weight) (total yield: 94.2%, purity: 98.1%). This substance is purified to give crystals melting at 201 to 203° C. (decomp.).

In addition, concentrated sulfuric acid is added to the filtrate and washings after iodination, and a prescribed amount of chlorine is added to the mixture. The precipitated iodine is collected by filtration. The amount of the recovered iodine is equivalent to 94.6% of the residual iodine after the reaction. The recovered iodine is dried and can be used again.

EXAMPLE 5

3-(p-nitrobenzenesulfonamido) - 5 - methylisoxazole is treated similarly to Example 4 to give 3-(p-nitrobenzenesulfonamido)-4-iodo-5-methylisoxazole as crystals melting at 187 to 188° C. (decomp.).

EXAMPLE 6

Into a flask, there are put iodine (13.96 parts by weight) and dry methanol (31 parts by volume). The reaction system is cooled at −15 to −10° C., and gaseous chlorine (3.79 parts by weight) is introduced thereto with stirring. The resultant mixture is kept at 3 to 4° C. for 0.5 to 1.0 hour. While stirring, 3-amino-5-methylisoxazole (9.81 parts by weight) is added to the reaction mixture, which is kept at 20 to 25° C. Four hours after addition of the isoxazole compound anhydrous trisodium phosphate (5.41 parts by weight) is added to the mixture, which is stirred for 4 hours and allowed to stand at room temperature for 4 hours. The reaction mixture is cooled below 10° C. with a cryogen of ice-sodium chloride, and 10% aqueous sodium sulfite solution (25.89 parts by weight) is added thereto to dissolve the dark brown color of the residual iodine. The resultant mixture is made slightly alkaline with 28% aqueous ammonia (2.97 parts by weight) and evaporated on a water bath under reduced pressure to remove the methanol. The residue is cooled at room temperature, mixed with water (100 parts by volume) and purified similarly to Example 1 by chloroform extraction to give 3-amino-4-iodo-5-methylisoxazole (20.58 parts by weight) as light yellow crystals showing a 98.04% of purity. The yield is 91.73%.

What is claimed is:

1. A process for preparing a 3-(substituted or unsubstituted)amino-4-iodo-5-methylisoxazole derivative of the formula

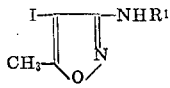

wherein R represents hydrogen or a p-(lower)alkanoyl-aminobenzenesulfonyl, p - nitrobenzenesulfonyl, lower alkanoyl or lower alkoxycarbonyl group which comprises reacting a 3-(substituted or unsubstituted)amino-5-methylisoxazole derivative of the formula

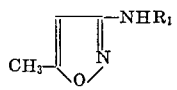

wherein $R^1$ represents hydrogen or a p-(lower)alkanoyl-aminobenzenesulfonyl, p - nitrobenzenesulfonyl, lower alkanoyl or lower alkoxycarbonyl group with a reagent mixture of iodine and chlorine in acetic acid or methanol, in the presence of a base selected from the group consisting of ammonium salts, alkali earth metal salts and alkali metal salts of phosphoric acid, acetic acid and methyl carbonic acid.

2. Process according to claim 1, in which the reaction is effected in acetic acid within a temperature range from 15 to 85° C.

3. Process according to claim 1, in which the reaction is effected in methanol within a temperature range from −20 to 64° C.

4. Process according to claim 1, in which the reaction is effected in acetic acid within a temperature range from 20 to 60° C.

5. Process according to claim 1, in which the reaction is effected in methanol within a temperature range from 15 to 45° C.

References Cited

UNITED STATES PATENTS

| | | | |
|---|---|---|---|
| 2,888,455 | 5/1959 | Kano et al. | 260—239.9 |
| 3,435,047 | 3/1969 | Iwai | 260—307 |

HENRY R. JILES, Primary Examiner

C. M. SHURKO, Assistant Examiner

U.S. Cl. X.R.

260—307 H

United States Patent Office
3,660,383
Patented May 2, 1972

3,660,383
PRODUCTION OF IODOISOXAZOLE COMPOUNDS
Shinzaburo Sumimoto, Osaka-shi, Yasuo Makisumi, Amagasaki-shi, and Hideo Kano, Ibaraki-shi, Japan, assignors to Shionogi & Co., Ltd., Osaka, Japan
No Drawing. Filed Aug. 6, 1969, Ser. No. 848,106
Claims priority, application Japan, Aug. 14, 1968, 43/57,834
Int. Cl. C07d 85/22, 85/24
U.S. Cl. 260—239.9                         5 Claims

ABSTRACT OF THE DISCLOSURE 3-(substituted or unsubstituted)amino-4-iodo-5-methylisoxazole derivatives of the formula:

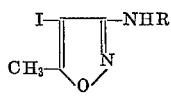

wherein R represents hydrogen, p-(lower)alkanoylaminobenzenesulfonyl group, p-nitrobenzenesulfonyl group, (lower)alkanoyl group or (lower)alkoxycarbonyl group are prepared in very high yield with high purity by reacting 3-(substituted or unsubstituted)amino-5-methylisoxazole derivatives with a reagent mixture from iodine and chlorine in acetic acid or methanol, in the presence of a base.

---

The present invention relates to industrial production of iodoisoxazole compounds. More particularly, it relates to an improvement in the production of 3-(substituted or unsubstituted)amino-4-iodo-5-methylisoxazole derivatives which are useful as sulfa drugs for humans and animals, agricultural chemicals and intermediates for syntheses of them. More specifically, this invention is concerned with the use of a reagent mixture from iodine and chlorine in acetic acid or methanol for the economical and industrial production of 3-(substituted or unsubstituted)amino-4-iodo-5-methylisoxazole derivatives.

The said iodoisoxazole compounds are represented by the formula:

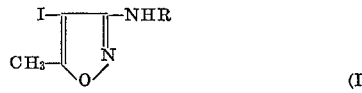
(I)

wherein R represent hydrogen, p-(lower)alkanoylaminobenzenesulfonyl group, p-nitrobenzenesulfonyl group, (lower)alkanoyl group or (lower)alkoxycarbonyl group.

These iodoisoxazole compounds have heretofore been prepared by the following three methods:

A. Method

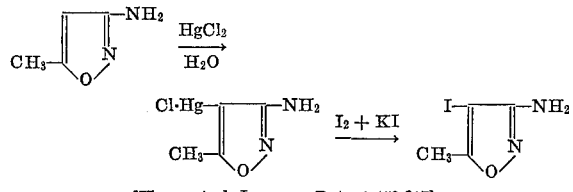

[Kano, et al: Japanese Patent 458,217]

B. Method

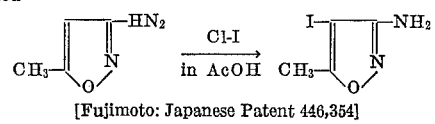

[Fujimoto: Japanese Patent 446,354]

C. Method

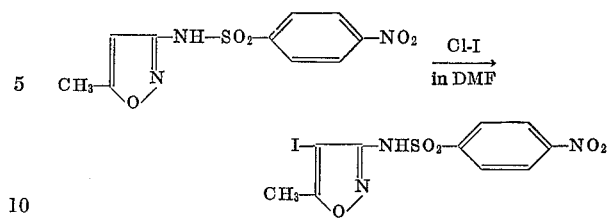

[Fujimoto: Japanese Patent 505,882]

Of these three methods, Method B (yield: 72%) and Method C (yield: 81%) using iodine monochloride are superior in the yield of Method A (yield: about 60%). The iodine monochloride is, however, instable and cannot be preserved for a long time. Still, the yield and purity of the product in these Methods B and C are unsatisfactory.

Further, Cassebaum et al. found a process for iodination of 3-aminodihydrocinnamic acid at the 2, 4 and 6-positions in a good yield by using a solution of sodium iodine dichloride (NaICl₂) obtained by suspending iodine in a saturated aqueous saline solution and introducing chlorine gas into the suspension [German Pat. 28,512]. For overcoming the defects of these known methods, the present inventors tried to apply the Cassebaum method for the iodination of 3-amino-5-methylisoxazole and 3-sulfanylamido-5-methylisoxazole, but such an attempt ended in failure without increase of the yield. Further, several tests were carried out using known iodinating reagents other than the above described reagents, but no improvement on the iodination of these isoxazole compounds was observed.

From the results of these tests, the present inventors have found that it is difficult to iodinate the 4-position of 3-(substituted or unsubstituted)amino-5-methylisoxazole in a good yield even with known iodinating reagents as can iodinate the benzene ring easily and that the iodination of 3-(substituted or unsubstituted)amino-5-methylisoxazole at the 4-position does not proceed favorably even with the conditions whereby 3-methyl-5-aminoisoxazole can be iodinated smoothly. In view of these facts, some specific and highly active iodinating reagents and/ or special conditions for reaction seem to be necessary for production of 3-(substituted or unsubstituted)-amino-4-iodo-5-methylisoxazole. As results of various investigations on iodinating reagents and reaction conditions for overcoming the said defects and for developing a very economical and industrial process, the present inventors have discovered that the selective iodination of 3-(substituted or unsubstituted)-5-methylisoxazole at the 4-position proceeds in a surprisingly high yield with a high purity by using a reagent mixture from iodine and chlorine in acetic acid or methanol in the presence of a base. Thus, the above defects of the known methods have now been overcome by the process of this invention.

Accordingly, it is an object of the present invention to provide a commercial and industrial process for preparing 3-(substituted or unsubstituted)amino-4-iodo-5-methylisoxazole derivatives (I) of high purity in a high yield. It is another object of this invention to provide a process for iodination of 3-(substituted or unsubstituted)amino-5-methylisoxazole derivatives (II) utilizing a reagent mixture from iodine and chlorine in acetic acid or methanol. These and other objects, and attendant advantages of the present invention, will be apparent to those who are conversant with the art to which this invention pertains, from the following disclosure and the appended claims.

The process of the present invention comprises reacting a compound represented by the formula:

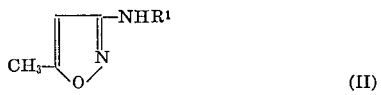
(II)

wherein $R^1$ represents hydrogen, p-(lower)alkanoylaminobenzenesulfonyl group, p - nitrobenzenesulfonyl group, (lower)alkanoyl group or (lower)alkoxycarbonyl group with a reagent mixture from iodine and chlorine in acetic acid or methanol, in the presence of a base to give a compound represented by the formula:

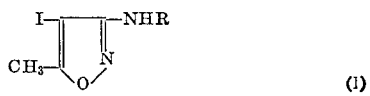
(I)

wherein R represents hydrogen, p-(lower)alkanoylaminobenzenesulfonyl group, p-nitrobenzenesulfonyl group, (lower)alkanoyl group or (lower)alkoxycarbonyl group.

The starting material (II) of the present invention is exemplified by 3-amino-5-methylisoxazole, 3-(p-acetylaminobenzenesulfonamido)-5-methylisoxazole, 3-(p-nitro benzenesulfonamido)-5-methylisoxazole, 3-acetylamino-5-methylisoxazole, and 3-ethoxycarbonylamino-5-methylisoxazole. These compounds are known and can be prepared readily in a conventional manner.

The iodinating reagent of this invention is a reagent mixture from iodine and chlorine in acetic acid or methanol, which can be obtained by mixing iodine with acetic acid or methanol, introducing almost one or slightly less than one atom equivalent of gaseous or liquid chlorine into the mixture while cooling and, when needed, warming the resultant mixture slightly for a while. In this case, the preparation of the reagent mixture may be effected in the range of temperature from 15 to 70° C., favorably from 15 to 50° C., in acetic acid and in the range of temperature from —20 to 50° C., favorably from —15 to 40° C., in methanol. The thus-prepared reagent mixture of this invention may be favorably used as soon as possible, although the reagent mixture in acetic acid can be preserved in stock. A suitable amount of the present reagent mixture is an amount corresponding to 2.0 to 2.4 atom equivalents of iodine for the amount of the starting material (II), when there is used a starting material having a benzene ring in the molecule (in the above Formula II $R^1$ represents p-(lower) alkanoylaminobenzenesulfonyl group or p-nitrobenzenesulfonyl group). When there is used a starting material having no benzene ring in the molecule (in the above Formula II $R^1$ represents hydrogen, (lower)alkanoyl group or (lower)alkoxycarbonyl group), a suitable amount of the reagent mixture is an amount corresponding to 1.0 and 1.2 atom equivalents of iodine for the amount of the starting material (II).

The base used in the process of this invention is generally exemplified by ammonium salts, alkali earth metal salts and alkali metal salts of phosphoric acid, acetic acid and methyl carbonic acid. Examples of the base are ammonium acetate, primary ammonium phosphate, secondary ammonium phosphate, potassium phosphate, sodium phosphate, dipotassium phosphate, disodium phosphate, tripotassium phosphate, trisodium phosphate, sodium methyl carbonate, potassium methyl carbonate, sodium acetate, potassium acetate, lithium acetate, primary calcium phosphate, secondary calcium phosphate and tertiary calcium phosphate. When the reagent mixture in methanol is used, alkali alkoxide such as sodium methoxide or potassium methoxide may be used, preferably in anhydrous conditions.

The process of this invention is executed by reacting the starting material (II) with the reagent mixture from iodine and chlorine in acetic acid or methanol, in the presence of a base. The reaction may be carried out in the range of temperature from 15 to 85° C., favorably from 20 to 60° C., in acetic acid and in the range of temperature from —20 to 64° C., favorably from 15 to 45° C., in methanol. Since the solvent (i.e. acetic acid, methanol) used for preparation of the reagent mixture can be applied for the present process as it is, any further preparation of solvent is not required, but, when needed, the same solvent as used in the reagent mixture may be added in an appropriate degree. Still, the process of this invention may be operative in both of a bath method and a continuous method.

The objective 3-(substituted or unsubstituted)amino-4-iodo-5-methylisoxazole derivatives (I) are exemplified by 3-amino-4-iodo-5-methylisoxazole,
3-(p-acetylaminobenzenesulfonamido)-
  4-iodo-5-methylisoxazole,
3-(p-n-butanoylaminobenzenesulfonamido)-
  4-iodo-5-methylisoxazole,
3-(p-nitrobenzenesulfonamido)-4-iodo-5-methyl-
  isoxazole,
3-acetylamino-4-iodo-5-methylisoxazole,
3-isopropanoylamino-4-iodo-5-methylisoxazole, and
3-ethoxycarbonylamino-4-iodo-5-methylisoxazole.

When the reaction of a starting material having the hydrolysis-sensitive substituent (e.g. acetylamino group, ethoxycarbonylamino group) is effected in methanol, there is obtained the hydrolyzed product. Thus, 3-amino-4-iodo-5-methylisoxazole is obtained from 3-(lower)alkanoylamino - 5 - methylisoxazole and 3-(lower)alkoxycarbonylamino-5-methylisoxazole by reaction in methanol. Since the iodination of the benzene ring may be threatened to occur together with hydrolysis of 3-[p-(lower)alkanoylaminobenzenesulfonamido] - 5 - methylisoxazole, the reaction of that compound in methanol must be avoided.

The process of the present invention is very economical and industrial, and its industrial merits are shown below.

(1) The reagent mixture from iodine and chlorine in acetic acid or methanol for iodination is commercially most available in comparison with known iodinating reagents. Since the iodination of the starting 3-(substituted or unsubstituted)amino-5-methylisoxazole (II) proceeds quantitatively and the residual iodine after the reaction can be recovered efficiently at the same time, there is observed no waste in this process.

(2) The process of this invention shows a considerable increase in the yield in comparison with those of known methods. For instance, the iodination at the 4-position of 3-amino-5-methylisoxazole in acetic acid with iodine monochloride affords only 72% of yield as shown in the above Method B, but the process of this invention affords a 94.2% of yield as shown in Example 1.

(3) The process of this invention affords a very high purity of the product. For instance, crude 3-amino-4-iodo-5-methylisoxazole is obtained in a 98.16% of purity as shown in Example 1, and its pure substance can be obtained by simple recrystallization.

Presently-preferred and practical embodiments of the present invention are illustratively shown in the following examples. The relationship of parts by weight to parts by volume is the same as that between grams and milliliters. Temperatures are set forth in degree centigrade.

EXAMPLE 1

Into a four-necked flask equipped with a stirrer, a thermometer, a drying tube of calcium chloride and a gas introducing tube, there are put iodine (13.96 parts by weight) and glacial acetic acid (32.66 parts by weight) (water content: 0.026%), and gaseous chlorine (3.89 parts by weight) is introduced into the reaction system with stirring to elevate the temperature of the mixture up to 25 to 32° C. The reaction mixture is stirred for half an hour at the same temperature, warmed at 50° C.